United States Patent
Nagata (10) Patent No.: US 9,692,065 B2
(45) Date of Patent: Jun. 27, 2017

(54) FUEL SUPPLY UNIT

(71) Applicant: AISAN KOGYO KABUSHIKI KAISHA, Obu-shi, Aichi (JP)

(72) Inventor: Sadatsugu Nagata, Aichi-gun (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 79 days.

(21) Appl. No.: 14/744,516

(22) Filed: Jun. 19, 2015

(65) Prior Publication Data

US 2016/0006050 A1 Jan. 7, 2016

(30) Foreign Application Priority Data

Jul. 3, 2014 (JP) ................................ 2014-137413

(51) Int. Cl.
| | |
|---|---|
| *B60T 8/36* | (2006.01) |
| *H01M 8/04089* | (2016.01) |
| *F17D 5/02* | (2006.01) |
| *H01M 8/04082* | (2016.01) |
| *H01M 8/0438* | (2016.01) |
| *H01M 8/04746* | (2016.01) |

(52) U.S. Cl.
CPC .......... *H01M 8/04104* (2013.01); *F17D 5/02* (2013.01); *H01M 8/04201* (2013.01); *H01M 8/04388* (2013.01); *H01M 8/04753* (2013.01)

(58) Field of Classification Search
CPC .......... Y10T 137/87265; Y02E 60/321; H01M 8/04; H01M 8/04201; H01M 8/04104; H01M 8/04388; H01M 8/04753; F17D 5/02
See application file for complete search history.

(56) References Cited

U.S. PATENT DOCUMENTS

| | | | | |
|---|---|---|---|---|
| 2002/0017329 | A1 | 2/2002 | Fukushima | |
| 2006/0024548 | A1* | 2/2006 | Pechtold | H01M 8/04089 429/446 |
| 2009/0155652 | A1* | 6/2009 | Umayahara | H01M 8/04097 429/443 |
| 2010/0323263 | A1* | 12/2010 | Katano | H01M 8/04089 429/444 |

(Continued)

FOREIGN PATENT DOCUMENTS

| | | |
|---|---|---|
| JP | 2002-048299 A | 2/2002 |
| JP | 2006-242222 A | 9/2006 |

(Continued)

*Primary Examiner* — Jessica Cahill
(74) *Attorney, Agent, or Firm* — Oliff PLC (57) ABSTRACT

A hydrogen supply unit is provided with an inflow block having an inflow passage for hydrogen gas, an outflow block having an outflow passage for hydrogen gas, injectors for adjusting a flow rate and a pressure of hydrogen gas, a secondary pressure sensor for detecting hydrogen gas pressure in the inflow passage, and a tertiary pressure sensor for detecting hydrogen gas pressure in the outflow passage. An inlet side of each injector is connected to the inflow passage and an outlet side of each injector is connected to the outflow passage. The hydrogen gas allowed to flow in the inflow passage is injected by each injector into the outflow passage and thereby reduced in pressure. Each of the injectors, secondary pressure sensor, and tertiary pressure sensor are held between the inflow block and outflow block.

8 Claims, 6 Drawing Sheets

(56) References Cited

U.S. PATENT DOCUMENTS

| | | | | |
|---|---|---|---|---|
| 2012/0115061 A1* | 5/2012 | Tsubokawa | .......... | B60K 15/013 |
| | | | | 429/446 |
| 2013/0071767 A1* | 3/2013 | Katano | ............. | H01M 8/04097 |
| | | | | 429/444 |
| 2013/0295491 A1* | 11/2013 | Takeyama | ......... | H01M 8/04089 |
| | | | | 429/513 |
| 2014/0147760 A1* | 5/2014 | Ohgami | ............ | H01M 8/04097 |
| | | | | 429/415 |
| 2014/0212780 A1* | 7/2014 | Furusawa | ......... | H01M 8/04955 |
| | | | | 429/429 |

FOREIGN PATENT DOCUMENTS

| | | |
|---|---|---|
| JP | 2010-003518 A | 1/2010 |
| JP | 2012-156033 A | 8/2012 |

* cited by examiner

FUEL SUPPLY UNIT

CROSS-REFERENCE TO RELATED APPLICATIONS

This application is based upon and claims the benefit of priority from the prior Japanese Patent Application No. 2014-137413 filed on Jul. 3, 2014, the entire contents of which are incorporated herein by reference.

BACKGROUND OF THE INVENTION

Field of the Invention

The present invention relates to a fuel supply unit to be used for adjusting a flow rate and a pressure of fuel gas to be supplied from a fuel container to a supply destination.

Related Art

Heretofore, there is known a fuel cell system disclosed in Japanese patent application publication No. 2012-156033 (JP-A-2012-156033), for example. This fuel cell system is provided with a fuel cell that will generate electric power by electric chemical reaction between hydrogen gas and air, a hydrogen tank that stores the hydrogen gas, and a hydrogen supply passage for supplying the hydrogen gas stored in the hydrogen tank to the fuel cell. In the hydrogen supply passage, a regulator is provided to reduce the pressure of the hydrogen gas. Downstream of the regulator, there are provided a plurality of injectors to control a flow rate and a pressure of the hydrogen gas to be supplied to the fuel cell. This system is configured to reduce the pressure of the hydrogen gas from the hydrogen tank by the regulator, injecting the pressure-reduced hydrogen gas through the injectors to thereby further reduce the pressure of the hydrogen gas, so that this hydrogen gas is then supplied to the fuel cell.

Herein, upstream of the injectors, an inlet-side manifold is provided. Those injectors are arranged in parallel, so that their inlets are individually connected to the inlet-side manifold. Downstream of the injectors, an outlet-side manifold is provided. Outlets of the injectors arranged in parallel are individually connected to the outlet-side manifold. The inlet-side manifold is supplied with hydrogen gas having the pressure reduced by the regulator. The outlet-side manifold is injected with hydrogen gas from the injectors. In the inlet-side manifold, a medium pressure sensor is provided for detecting the pressure (medium pressure) of the hydrogen gas whose pressure has been reduced by the regulator. This medium pressure sensor is located at an upper part of the inlet-side manifold so as to protrude outside. In the outlet-side manifold, further, a low pressure sensor is provided for detecting the pressure (low pressure) of the hydrogen gas just before being supplied to the fuel cell. This low pressure sensor is located at an upper part of the outlet-side manifold so as to protrude outside. Since the inlet-side manifold, the outlet-side manifold, the injectors, the medium pressure sensor, and the low pressure sensor are integrally provided as above, a hydrogen gas supply pipe system is unitized into a unit, and further this unit is configured in compact size.

SUMMARY OF INVENTION

Problems to be Solved by the Invention

The technique disclosed in JP-A-2012-156033 enables the hydrogen gas supply pipe system to be unitized into a unit; however, each of the medium pressure sensor and the low pressure sensor being provided to protrude outside from the manifold would impede reduction in size of the unit just by that much. For easily mounting this unit for example in a limited space of an engine room in a vehicle, it is desired that the unit is further reduced in size.

The present invention has been made in view of the foregoing circumstances and has a purpose to provide a fuel supply unit integrally provided with at least one injector, a first pressure sensor, and a second pressure sensor to achieve reduction in size and simplification in structure.

Means of Solving the Problems

To achieve the above problems, one aspect of the invention provides a fuel supply unit including: an inflow block having an inflow passage for allowing fuel gas to flow in the fuel supply unit; an outflow block having an outflow passage for allowing the fuel gas to flow out of the fuel supply unit; at least one injector to adjust a flow rate and a pressure of the fuel gas, the injector having an inlet side connected to the inflow passage of the inflow block having an outlet side connected to the outflow passage of the outflow block; a first pressure sensor to detect pressure of the fuel gas in the inflow passage as inflow pressure; and a second pressure sensor to detect pressure of the fuel gas in the outflow passage as outflow pressure, the injector being operative to inject the fuel gas flowing in the inflow passage into the outflow passage to reduce the pressure of the fuel gas, wherein the injector, the first pressure sensor, and the second pressure sensor are held between the inflow block and the outflow block.

Advantageous Effects of Invention

According to the invention, it is possible to achieve reduction in size and simplification in structure of a fuel supply unit integrally provided with at least on injector, a first pressure sensor, and a second pressure sensor.

DESCRIPTION OF EMBODIMENTS

First Embodiment

A detailed description of a first embodiment in which a fuel supply unit according to the present invention is embodied as a fuel cell system will now be given referring to the accompanying drawings.

Figure 1:
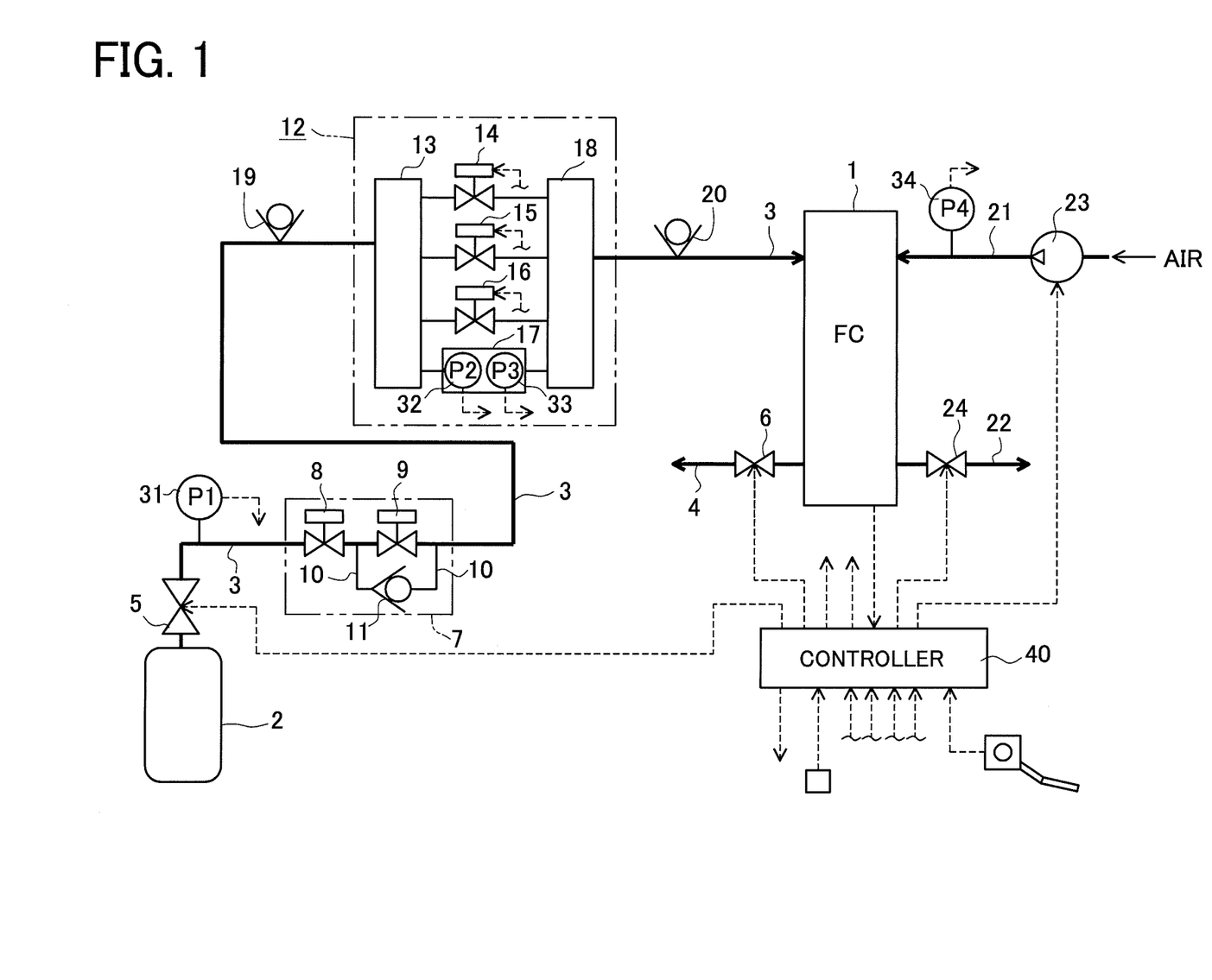
FIG. 1 is a schematic configuration diagram showing a fuel cell system in a first embodiment.

FIG. 1 is a schematic configuration diagram of a fuel cell system of the present embodiment. This fuel cell system will be mounted in an electric vehicle and used to supply electric power to a motor for driving the vehicle (not shown). The fuel cell system is provided with a fuel cell (FC) 1 and a hydrogen cylinder 2. The fuel cell 1 is configured to be supplied with hydrogen gas as fuel gas and air as oxidant gas to generate electric power. The electric power generated in the fuel cell 1 is supplied to the driving motor (not shown) through an inverter (not shown). The hydrogen cylinder 2 stores high-pressure hydrogen gas.

On an anode side of the fuel cell 1, a hydrogen supply system is provided. This hydrogen supply system includes a hydrogen supply passage 3 for supplying hydrogen gas from the hydrogen cylinder 2 to the fuel cell 1 which is a supply destination, and a hydrogen discharge passage 4 for discharging hydrogen offgas allowed to flow out of the fuel cell 1. In the hydrogen supply passage 3 immediately downstream of the hydrogen cylinder 2, there is provided a main stop valve 5 consisting of an electromagnetic valve for switching between supply and shut-off of hydrogen gas from the hydrogen cylinder 2 to the hydrogen supply passage 3. In the hydrogen discharge passage 4, a first changeover valve 6 consisting of an electromagnetic valve is provided.

In the hydrogen supply passage 3 downstream of the main stop valve 5, a high-pressure regulator 7 is provided to reduce the pressure of hydrogen gas. In the hydrogen supply passage 3 between the main stop valve 5 and the high-pressure regulator 7, a primary pressure sensor 31 is provided to detect the pressure in the passage 3 as primary pressure P1. This primary pressure P1 may be assigned a value falling within a range of 0.1 to 90 (MPa), for example.

The high-pressure regulator 7 includes a first regulator 8 and a second regulator 9, which are arranged in series, a communication passage 10 for allowing fluid communication between an upstream side and a downstream side of the second regulator 9, and a check valve 11 placed in the communication passage 10. These components are integrally unitized into one unit. In the high-pressure regulator 7, the pressure of hydrogen gas reduced by the first regulator 8 is further reduced by the second regulator 9. Specifically, in the high-pressure regulator 7, the pressure of hydrogen gas is reduced in two stages.

In the hydrogen supply passage 3 downstream of the high-pressure regulator 7, a hydrogen supply unit 12 is provided to adjust the flow rate and the pressure of hydrogen gas to be supplied to the fuel cell 1. The hydrogen supply unit 12 corresponds to one example of a fuel supply unit of the present invention and includes a delivery pipe 13, a plurality of injectors 14, 15, and 16, a medium-low pressure sensor 17, and a junction pipe 18, which are integrally unitized into one unit.

The delivery pipe 13 serves to distribute the hydrogen gas of the hydrogen supply passage 3 into the plurality of injectors 14 to 16 and has a predetermined volume. To this delivery pipe 13, inlet sides of the injectors 14 to 16 are connected in parallel to each other. The junction pipe 18 serves to merge streams of hydrogen gas injected from the injectors 14 to 16 and has a predetermined volume. To this junction pipe 18, outlet sides of the injectors 14 to 16 are connected in parallel to each other. The injectors 14 to 16 include a first injector 14, a second injector 15, and a third injector 16, each of which injects a normal flow rate. Each of the injectors 14 to 16 is set at a valve opening pressure that enables valve opening of each injector 14 to 16 and that corresponds to the pressure of hydrogen gas acting on an upstream side of each injector 14 to 16. In the present embodiment, the valve opening pressure of each injector 14 to 16 is set to 3 MPa, for example.

The medium-low pressure sensor 17 is disposed between the delivery pipe 13 and the junction pipe 18, and includes a secondary pressure sensor 32 and a tertiary pressure sensor 33. The secondary pressure sensor 32 serves to detect the inner pressure of the delivery pipe 13 located immediately upstream of each injector 14 to 16, as a secondary pressure P2 which is a medium pressure. The secondary pressure P2 can be assigned a value falling within a range of 1.1 to 1.6 (MPa), for example. The tertiary pressure sensor 33 serves to detect the inner pressure of the junction pipe 18 located immediately downstream of each injector 14 to 16, as a tertiary pressure P3 which is a low pressure. This tertiary pressure P3 can be assigned a value falling within a range of 0.1 to 0.3 (MPa), for example.

A medium pressure relief valve 19 is provided in a portion of the hydrogen supply passage 3 upstream of the hydrogen supply unit 12. The relief valve 19 is configured to open when the inner pressure of the upstream portion of the passage 3 increases to a predetermined value (e.g., 3 MPa) or more, thereby releasing the pressure therefrom. A low-pressure relief valve 20 is provided in a portion of the hydrogen supply passage 3 downstream of the hydrogen supply unit 12. The low-pressure relief valve 20 is configured to open when the inner pressure of the downstream portion of the passage 3 increases to a predetermined value, thereby releasing the pressure therefrom.

On the other hand, on a cathode side of the fuel cell 1, there are provided an air supply passage 21 for supplying air to the fuel cell 1 and an air discharge passage 22 for discharging out air offgas allowed to flow out. In the air supply passage 21, an air pump 23 is provided to adjust a flow rate of air to be supplied to the fuel cell 1. In the air supply passage 21 downstream of the air pump 23, an air pressure sensor 34 is provided to detect air pressure P4. A second changeover valve 24 constituting an electromagnetic valve is provided in the air discharge passage 22.

In the foregoing structure, the hydrogen gas fed from the hydrogen cylinder 2 passes through the hydrogen supply passage 3 and then is supplied to the fuel cell 1 via the main stop valve 5, the high-pressure regulator 7, and the hydrogen supply unit 12. The hydrogen gas supplied to the fuel cell 1 is used for generation of electric power in the cell 1, and thereafter discharged as hydrogen offgas from the cell 1 via the hydrogen discharge passage 4 and the first changeover valve 6.

In the foregoing structure, furthermore, the air discharged into the air supply passage 21 by the air pump 23 is supplied to the fuel cell 1. The air supplied to the fuel cell 1 is used for generation of electric power in the cell 1, and thereafter discharged as air offgas from the cell 1 via the air discharge passage 22 and the second changeover valve 24.

This fuel cell system is further provided with a controller 40 responsible for control of the system. To control a flow of hydrogen gas to be supplied to the fuel cell 1, the controller 40 controls the main stop valve 5 and each of the injectors 14 to 16 based on detection values of the primary pressure sensor 31, the secondary pressure sensor 32, and the tertiary pressure sensor 33. The controller 40 further controls the first changeover valve 6 to control a flow of hydrogen offgas in the hydrogen discharge passage 4. On the other hand, the controller 40 controls the air pump 23 based on a detection value of the air pressure sensor 34 to control a flow of air to be supplied to the fuel cell 1. The controller 40 also controls the second changeover valve 24 to control a flow of air offgas in the air discharge passage 22. The controller 40 receives a voltage value and a current value resulting from generation of electric power in the fuel cell 1. The controller 40 includes a central processing unit (CPU) and a memory and thus controls each injector 14 to 16, the air pump 23, and others based on a predetermined control program stored in the memory in order to control an amount of hydrogen gas and an amount of air to be supplied to the fuel cell 1.

Figure 2:
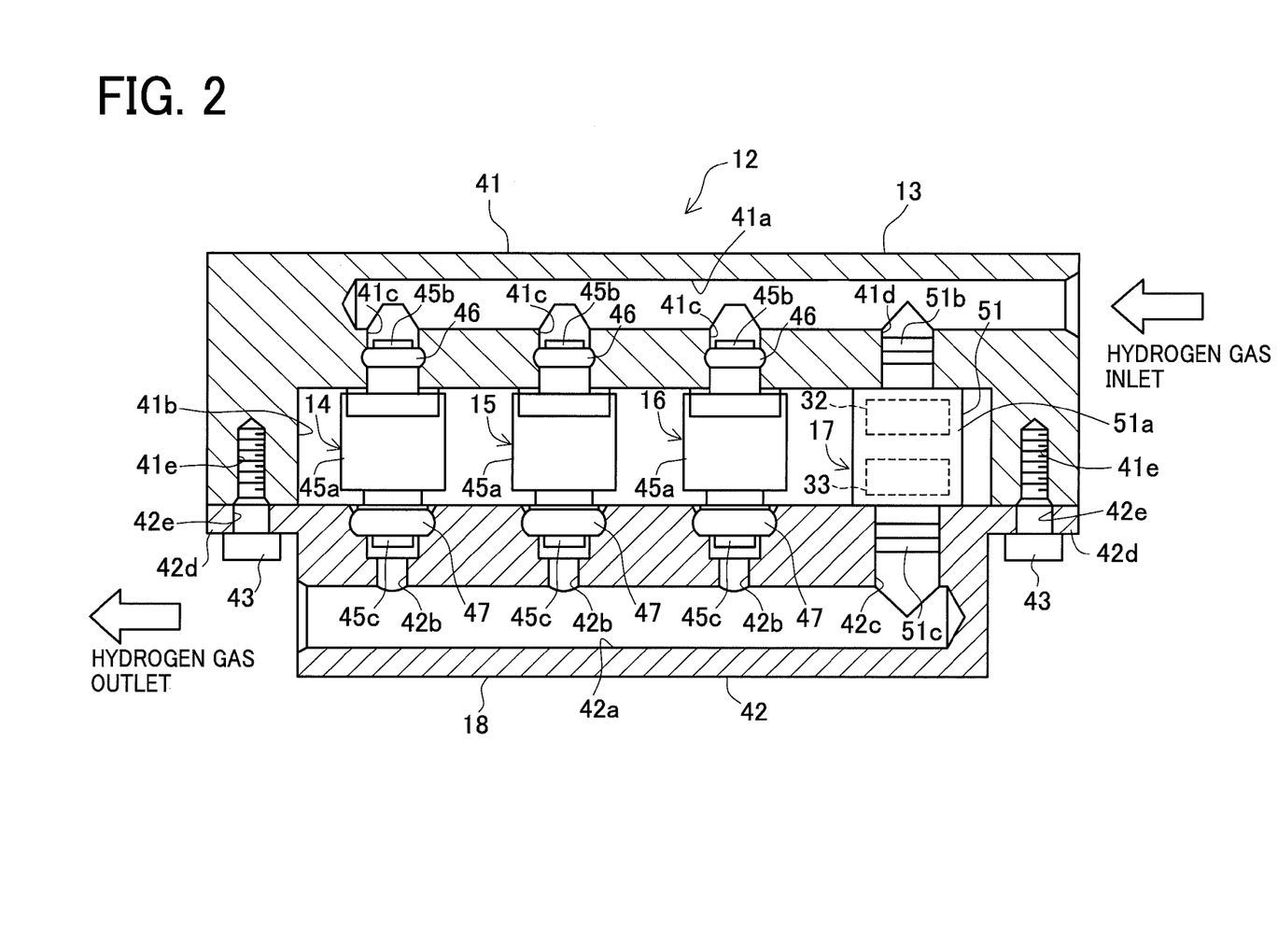
FIG. 2 is a view of a hydrogen supply unit in which an inflow block and an outflow block are shown in a cross-section in the first embodiment.

Next, the structure of the hydrogen supply unit 12 will be explained in detail. FIG. 2 is a cross sectional view of the hydrogen supply unit 12. The hydrogen supply unit 12 includes an inflow block 41 having an inflow passage 41a for allowing hydrogen gas to flow in the hydrogen supply unit 12, an outflow block 42 having an outflow passage 42a for allowing hydrogen gas to flow out of the hydrogen supply unit 12, the first injector 14, the second injector 15, and the third injector 16 to adjust a flow rate and a pressure of hydrogen gas, and the medium-low pressure sensor 17. The inlet sides of the injectors 14 to 16 are connected to the inflow passage 41a of the inflow block 41, while the outlet sides of the injectors 14 to 16 are connected to the outflow passage 42a of the outflow block 42. The inflow block 41 constitutes the delivery pipe 13, and the outflow block 42 constitutes the junction pipe 18. The medium-low pressure sensor 17 includes the secondary pressure sensor 32 to detect the inflow pressure (medium pressure) of hydrogen gas in the inflow passage 41a as the secondary pressure P2 and the tertiary pressure sensor 33 to detect the outflow pressure (low pressure) of hydrogen gas in the outflow passage 42a as the tertiary pressure P3. In the present embodiment, specifically, the secondary pressure sensor 32 and the tertiary pressure sensor 33 are configured to be integrally provided in a single case 51 to enable simultaneous detection of the secondary pressure P2 and the tertiary pressure P3. The secondary pressure sensor 32 corresponds to one example of a first pressure sensor of the present invention. The tertiary pressure sensor 33 corresponds to one example of an outflow pressure sensor of the invention. The hydrogen supply unit 12 is configured to inject the hydrogen gas introduced in the inflow passage 41a into the outflow passage 51 through each of the injectors 14 to 16, thereby reducing the pressure of hydrogen gas. Herein, the hydrogen supply unit 12 is designed so that the injectors 14 to 16 and the medium-low pressure sensor 17 are held, or clamped, between the inflow block 41 and the outflow block 42 and thus they are integrated in one piece.

As shown in FIG. 2, each of the injectors 14 to 16 includes a cylindrical main part 45a, an inlet pipe 45b of a cylindrical shape protruding from one end of the main part 45a and having a smaller diameter than the main part 45a to allow inflow of hydrogen gas, and a nozzle pipe 45c of a cylindrical shape protruding from the other end of the main part 45a and having a smaller diameter than the main part 45a to allow outflow of hydrogen gas. The medium-low pressure sensor 17 has an outer shape similar to an outer shape of each injector 14 to 16 and thus includes a first inflow pipe 51b protruding from one end of a cylindrical main part 51a to allow inflow of hydrogen gas and a second inflow pipe 51c protruding from the other end of the main part 51a to allow inflow of hydrogen gas.

Figure 3:
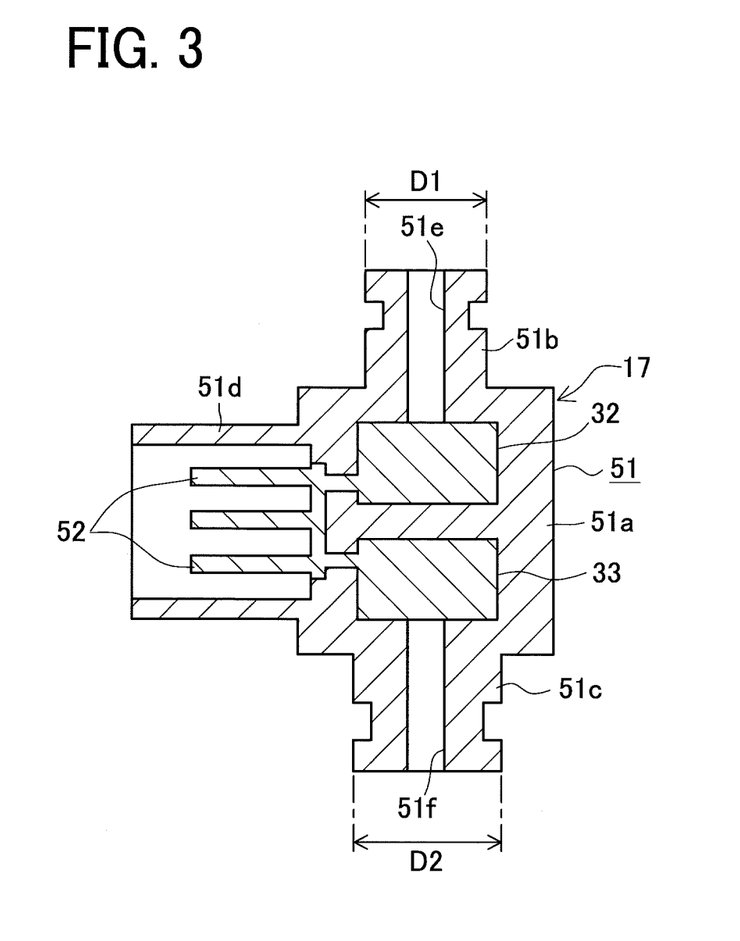
FIG. 3 is a cross sectional view of a medium-low pressure sensor in the first embodiment.

FIG. 3 is a cross sectional view of the medium-low pressure sensor 17. As shown in FIG. 3, the medium-low pressure sensor 17 is designed so that the case 51 is integrally formed of the main part 51a and the first and second inflow pipes 51b and 51c. Further, the main part 51a is integrally formed with a connector 51d protruding sideways. The outer diameter D1 of the first inflow pipe 51b is set to be smaller than the outer diameter D2 of the second inflow pipe 51c. Accordingly, the first inflow pipe 51b and the second inflow pipe 51c are distinguishable in appearance. When the medium-low pressure sensor 17 is to be assembled to each block 41 and 42, this appearance distinction enables preventing mix-up between the secondary pressure sensor 32 side and the tertiary pressure sensor 33 side. The inflow pipes 51b and 51c are respectively formed with inflow ports 51e and 51f. In the main part 51a, the secondary pressure sensor 32 and the tertiary pressure sensor 33 are built in at one ends of the corresponding inflow ports 51e and 51f. Each of the sensors 32 and 33 is constituted of a semiconductor and others. These sensors 32 and 33 are connected to terminals 52 provided in the connector 51d. The terminals 52 in the connector 51d will be connected to an external wiring (not shown).

As shown in FIG. 2, the inflow block 41 includes, in addition to the inflow passage 41a, a recessed cavity 41b for accommodating the main parts 45a of the injectors 14 to 16 and the main part 51a of the medium-low pressure sensor 17, inflow ports 41c in which the inlet pipes 45b of the injectors 14 to 16 are individually inserted, and a first inflow port 41d in which the first inflow pipe 51b of the medium-low pressure sensor 17 is inserted. The inflow block 41 is formed with female screw holes 41e adjacent to both ends of the recessed cavity 41b in a longitudinal direction thereof. The inlet pipes 45b are inserted one in each of the corresponding inflow ports 41c through a rubber ring 46.

As shown in FIG. 2, the outflow block 42 includes, in addition to the outflow passage 42a, nozzle holes 42b in which the corresponding nozzle pipes 45c of the injectors 14 to 16 are individually inserted, and a second inflow port 42c in which the second inflow pipe 51c of the medium-low pressure sensor 17 is inserted. The outflow block 42 is formed with flanges 42d and bolt holes 42e at both ends in a longitudinal direction of the block 42. Each of the nozzle pipes 45c is inserted in the corresponding nozzle hole 42b through a rubber ring 47. The inflow block 41 and the outflow block 42 are configured to be secured to each other with two bolts 43 in the flanges 42d at both ends of the outflow block 42. The two bolts 43 are used only to secure the inflow block 41 and the outflow block 42. The bolts 43 are inserted one in each of the bolt holes 42e of the flanges 42d and screwed into the female screw holes 41e of the inflow block 41, thereby securing the inflow block 41 to the outflow block 42.

According to the hydrogen supply unit in the present embodiment explained above, the inflow block 41 having the inflow passage 41a, the outflow block 42 having the outflow passage 42a, the injectors 14 to 16, and the medium-low pressure sensor 17 including the secondary pressure sensor 32 and the tertiary pressure sensor 33 are integrally unitized into one unit. Herein, the injectors 14 to 16 and the medium-low pressure sensor 17 are held between the inflow block 41 and the outflow block 42, so that the injectors 14 to 16 and the medium-low pressure sensor 17 are assembled in the inflow block 41 and the outflow block 42 without protruding from those blocks 41 and 42. Thus, the hydrogen supply unit 12 integrally provided with the injectors 14 to 16 and the medium-low pressure sensor 17 can achieve reduced size and simplified structure.

Figure 4:
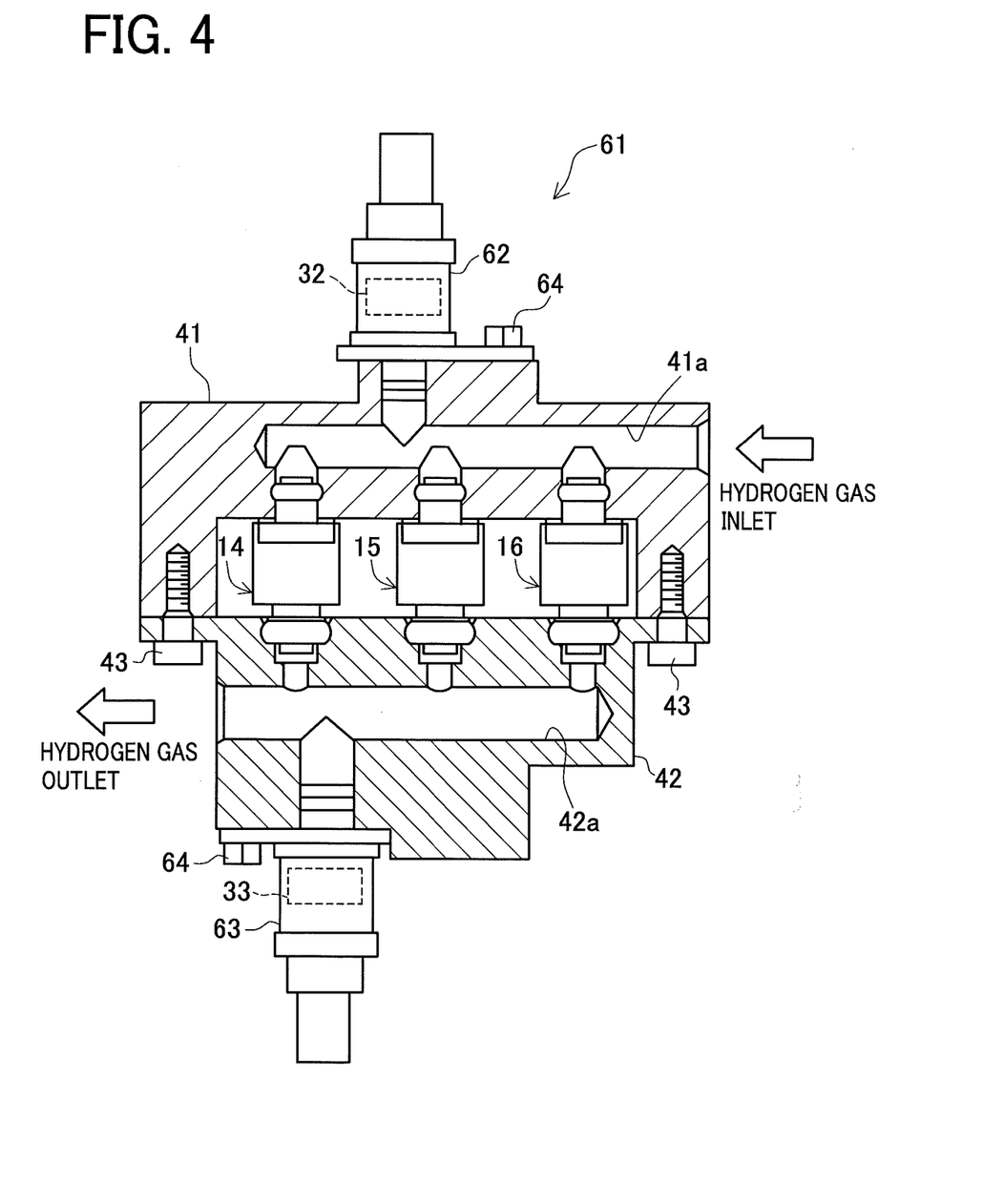
FIG. 4 is a view of a comparison example of a hydrogen supply unit in which an inflow block and an outflow block are shown in a cross-section in the first embodiment.

FIG. 4 is a cross sectional view of a hydrogen supply unit 61 in a comparative example. In this hydrogen supply unit 61, similar to the above-explained present embodiment, the injectors 14 to 16 are held between the inflow block 41 and the outflow block 42. However, a first case 62 internally containing the secondary pressure sensor 32 is placed on the outside of the inflow block 41 (on an upper side in FIG. 4) and a second case 63 internally containing the tertiary pressure sensor 33 is placed on the outside of the outflow block 42 (on a lower side in FIG. 4). These cases 62 and 63 are fixed in respective places with bolts 64. The blocks 41 and 42 are each formed having a thick wall portion for allowing the cases 62 and 63 to be respectively fixed thereto. The hydrogen supply unit 61 in this comparative example, in which each block 41 and 42 has a thick wall portion and hence the cases 62 and 63 of the secondary pressure sensor 32 and the tertiary pressure sensor 33 protrude outward from the corresponding blocks 41 and 42, is increased in size by just that much. The hydrogen supply unit 12 in the present embodiment, to the contrary, in which each block 41 and 42 has no thick wall portion and the medium-low pressure sensor 17 internally containing the secondary pressure sensor 32 and the tertiary pressure sensor 33 does not protrude outward from each block 41 and 42, can be reduced in size by just that much as compared with the hydrogen supply unit 61 in the comparative example.

In the present embodiment, the secondary pressure sensor 32 and the tertiary pressure sensor 33 are integrally provided in the single case 51 to constitute the medium-low pressure sensor 17. This can reduce the space needed for the secondary pressure sensor 32 and the tertiary pressure sensor 33 as compared with a configuration that those sensors 32 and 33 are provided in separate cases. Accordingly, the hydrogen supply unit 12 can be further downsized just for such a reduced part of the space for the pressure sensors.

According to the present embodiment, the two bolts 43 are used only to secure the inflow block 41 and the outflow block 42. This securing work of the inflow block 41 and the outflow block 42 is thus easy. Such an easy securing work contributes to simplified manufacture of the hydrogen supply unit 12.

In the present embodiment, the medium-low pressure sensor 17 including the secondary pressure sensor 32 and the tertiary pressure sensor 33 is provided in the case 51 having the outer shape similar to the outer shape of each injector 14 to 16. This facilitates a work of assembling the injectors 14 to 16 and the medium-low pressure sensor 17 between the inflow block 41 and the outflow block 42. Thus, such an easy assembling work contributes to further simplified manufacture of the hydrogen supply unit 12.

Second Embodiment

Next, a second embodiment in which the fuel supply unit according to the present invention is embodied as a fuel cell system will be explained in detail referring to the accompanying drawings.

In the following explanation, similar or identical components to those in the first embodiment are assigned the same reference signs as those in the first embodiment. Thus, the following explanation is given with a focus on different points from the first embodiment.

Figure 5:
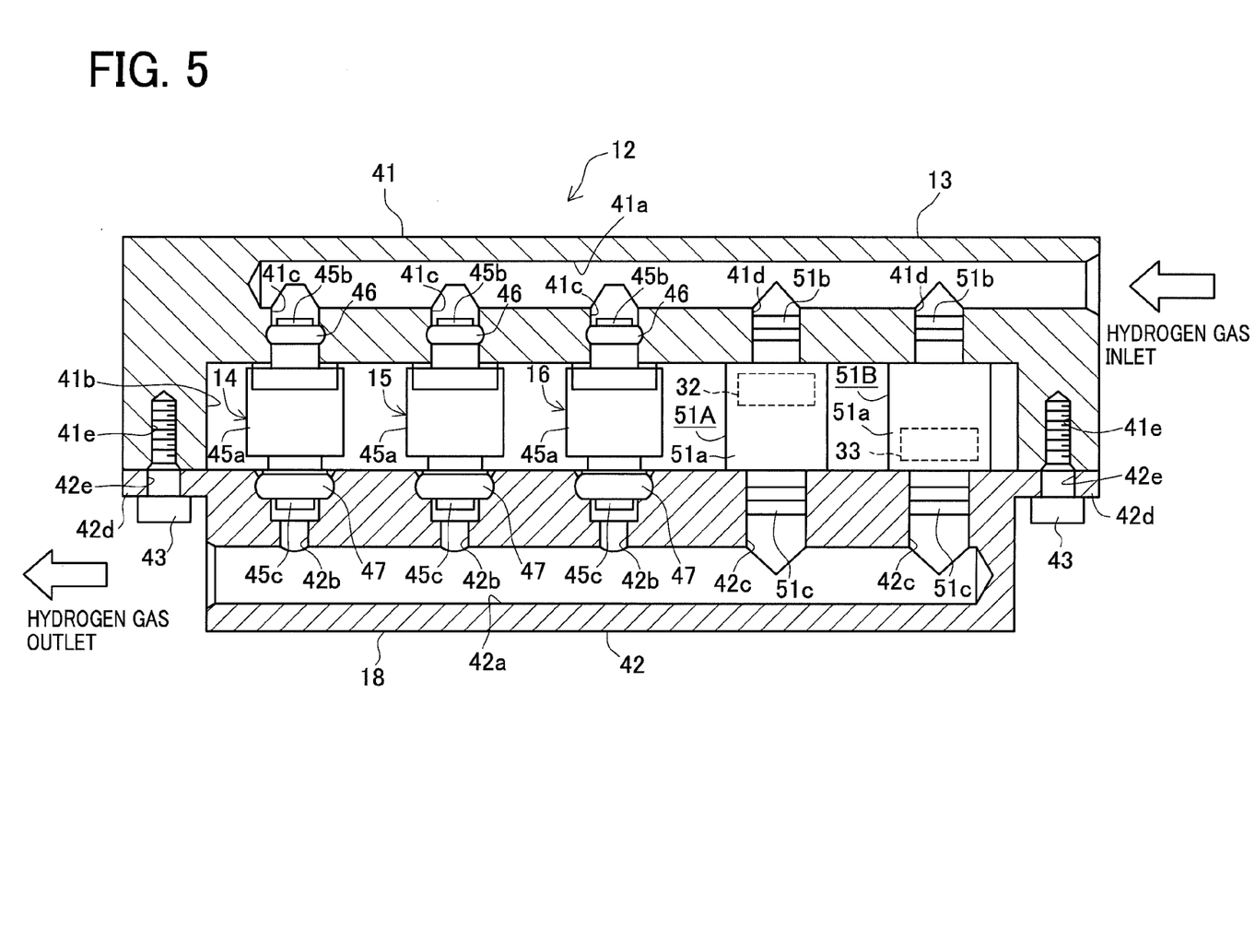
FIG. 5 is a view of a hydrogen supply unit in which an inflow block and an outflow block are shown in a cross-section in a second embodiment.

FIG. 5 is a cross sectional view of the hydrogen supply unit 12 in the second embodiment. This embodiment differs from the first embodiment in that the secondary pressure sensor 32 and the tertiary pressure sensor 33 are provided respectively in separate cases 51A and 51B and accordingly the shapes of the inflow block 41 and the outflow block 42 are designed therefor. In the present embodiment, specifically, for the purpose of providing two cases 51A and 51B, the inflow block 41 and the outflow block 42 are formed horizontally longer as shown in FIG. 5 than in the first embodiment. In the inflow block 41, furthermore, the recessed cavity 41b is formed horizontally longer than in the first embodiment and formed with two first inflow ports 41d. In the outflow block 42, similarly, two second inflow ports 42c are formed.

Figure 6:
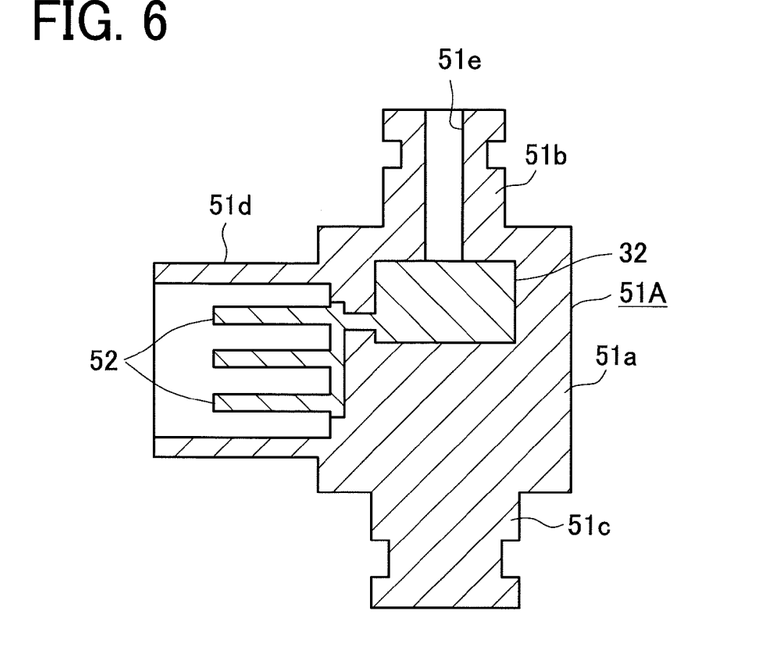
FIG. 6 is a cross sectional view of a first case internally containing a secondary pressure sensor in the second embodiment.
Figure 7:
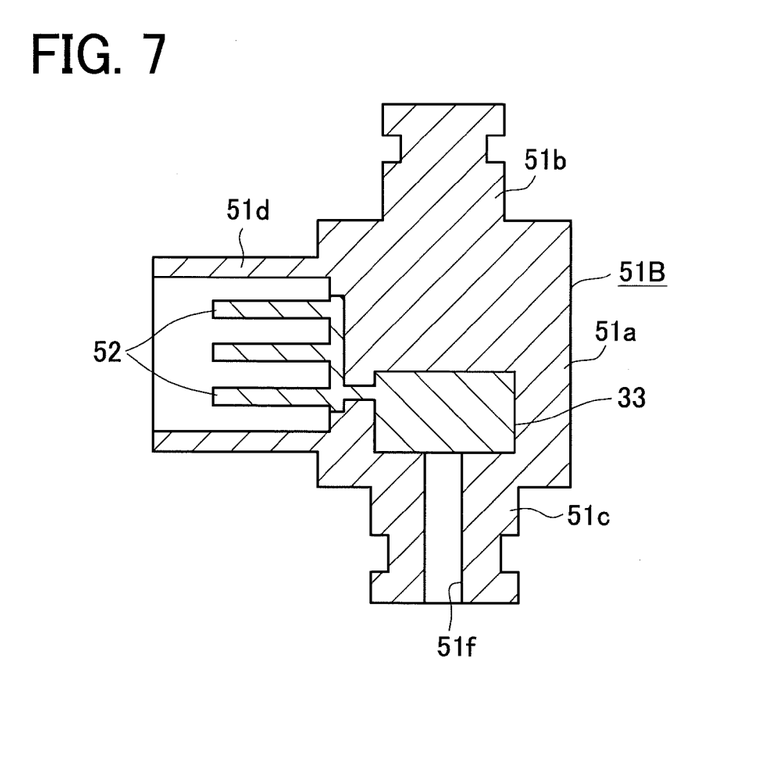
FIG. 7 is a cross sectional view of a second case internally containing a tertiary pressure sensor in the second embodiment.

FIG. 6 is a cross sectional view of the first case 51A internally containing the secondary pressure sensor 32. FIG. 7 is a cross sectional view of the second case 51B internally containing the tertiary pressure sensor 33. The first case 51A is not formed with the inflow port 51f in the second inflow pipe 51c. The second case 51B is not formed with the inflow port 51e in the first inflow pipe 51b.

Accordingly, the hydrogen supply unit 12 in the present embodiment, even though it is entirely longer in a lateral direction than in the first embodiment, can also provide equivalent operations and effects to in the first embodiment.

The present invention is not limited to the foregoing embodiments and may be embodied in other specific forms without departing from the essential characteristics thereof.

In each of the above-described embodiments, the high-pressure regulator 7 is constituted by two regulators 8 and 9. As an alternative, a high-pressure regulator (a pressure reducing device) maybe constituted by three or more regulators (pressure adjusting valves).

In each of the above-described embodiments, three injectors 14 to 16 are provided. However, the number of injectors may be increased or decreased as needed.

In each of the above-described embodiments, the fuel supply unit of the present invention is embodied in the hydrogen supply unit 12 of the fuel cell system. As alternatives, the fuel supply unit of the present invention may be embodied in a CNG supply unit of a bi-fuel engine system using gasoline and CNG (compressed natural gas) as fuel or in a CNG supply unit of a mono-fuel engine system using only CNG as fuel.

INDUSTRIAL APPLICABILITY

The present invention is utilizable in a fuel supply system of an internal combustion engine and a fuel cell system to be mounted in vehicles.

REFERENCE SIGNS LIST

14 First injector
15 Second injector
16 Third injector
32 Secondary pressure sensor (First pressure sensor)
44 Tertiary pressure sensor (Second pressure sensor)
41 Inflow block
41a Inflow passage
42 Outflow block
42a Outflow passage
43 Bolt
45a Main part
45b Inlet pipe
45c Nozzle pipe
51 Case
51A First case
51B Second case

The invention claimed is:
1. A fuel supply unit comprising:
an inflow block having an inflow passage allowing fuel gas to flow in the fuel supply unit;
an outflow block having an outflow passage for allowing the fuel gas to flow out of the fuel supply unit;
at least one injector to adjust a flow rate and a pressure of the fuel gas, the at least one injector having an inlet side connected to the inflow passage of the inflow block, the at least one injector having an outlet side connected to the outflow passage of the outflow block, a first pressure sensor configured to detect pressure of the fuel gas in the inflow passage as an inflow pressure; and a second pressure sensor configured to detect pressure of the fuel gas in the outflow passage as an outflow pressure, wherein:

the injector injects the fuel gas flowing in the inflow passage into the outflow passage to reduce the pressure of the fuel gas, and the at least one injector, the first pressure sensor, and the second pressure sensor are each held between the inflow block and the outflow block, by one end of each of the at least one injector, the first pressure sensor, and the second pressure sensor being secured to the inflow block and another end of each of the at least one injector, the first pressure sensor, and the second pressure sensor being secured to the outflow block.

2. The fuel supply unit according to claim 1, wherein: the injector includes:

a main part of a cylindrical shape;

an inlet pipe of a cylindrical shape, the inlet pipe protruding from one end of the main part and having a smaller diameter than the main part; and a nozzle pipe of a cylindrical shape, the nozzle pipe protruding from another end of the main part and having a smaller diameter than the main part, and the first pressure sensor and the second pressure sensor are provided in a case of a substantially same outer shape as an outer shape of the at least one injector.

3. The fuel supply unit according to claim 1, wherein the inflow block and the outflow block are secured to each other with a bolt that is used only to secure the inflow block and the outflow block.

4. The fuel supply unit according to claim 3, wherein: the injector includes:

a main part of a cylindrical shape;

an inlet pipe of a cylindrical shape, the inlet pipe protruding from one end of the main part and having a smaller diameter than the main part; and a nozzle pipe of a cylindrical shape, the nozzle pipe protruding from another end of the main part and having a smaller diameter than the main part, and the first pressure sensor and the second pressure sensor are provided in a case of a substantially same outer shape as an outer shape of the at least one injector.

5. The fuel supply unit according to claim 1, wherein the first pressure sensor and the second pressure sensor are integrally provided in a single case to simultaneously detect the inflow pressure and the outflow pressure.

6. The fuel supply unit according to claim 5, wherein: the injector includes:

a main part of a cylindrical shape;

an inlet pipe of a cylindrical shape, the inlet pipe protruding from one end of the main part and having a smaller diameter than the main part; and a nozzle pipe of a cylindrical shape, the nozzle pipe protruding from another end of the main part and having a smaller diameter than the main part, and the first pressure sensor and the second pressure sensor are provided in a case of a substantially same outer shape as an outer shape of the at least one injector.

7. The fuel supply unit according to claim 5, wherein the inflow block and the outflow block are secured to each other with a bolt that is used only to secure the inflow block and the outflow block.

8. The fuel supply unit according to claim 7, wherein: the injector includes:

a main part of a cylindrical shape;

an inlet pipe of a cylindrical shape, the inlet pipe protruding from one end of the main part and having a smaller diameter than the main part; and a nozzle pipe of a cylindrical shape, the nozzle pipe protruding from another end of the main part and having a smaller diameter than the main part, and the first pressure sensor and the second pressure sensor are provided in a case of a substantially same outer shape as an outer shape of the at least one injector.

* * * * *